April 21, 1942. H. B. TYLER 2,280,734
CYCLE HITCH
Filed Nov. 6, 1939 2 Sheets-Sheet 1

Inventor
Harold B. Tyler
By Clarence A. O'Brien
and Hyman Berman
Attorneys

April 21, 1942. H. B. TYLER 2,280,734
CYCLE HITCH
Filed Nov. 6, 1939 2 Sheets-Sheet 2

Inventor
Harold B. Tyler
By Clarence A. O'Brien
and Hyman Berman
Attorneys

Patented Apr. 21, 1942

2,280,734

UNITED STATES PATENT OFFICE 2,280,734

CYCLE HITCH

Harold B. Tyler, Memphis, Tenn.

Application November 6, 1939, Serial No. 303,117

7 Claims. (Cl. 280—292)

My invention relates to improvements in means for hitching a bicycle or tricycle vehicle by its front dirigible wheel structure to a tractor vehicle, and the primary object of the invention is to provide a structurally sound and efficient arrangement of this character which can be provided at relatively low cost.

Other important objects and advantages of my invention will be apparent from a reading of the following description taken in connection with the drawings, wherein for purposes of illustration I have shown a preferred embodiment of my invention.

In the drawings:

Figure 5 is a group perspective view of the hitch connections.

Figure 1:
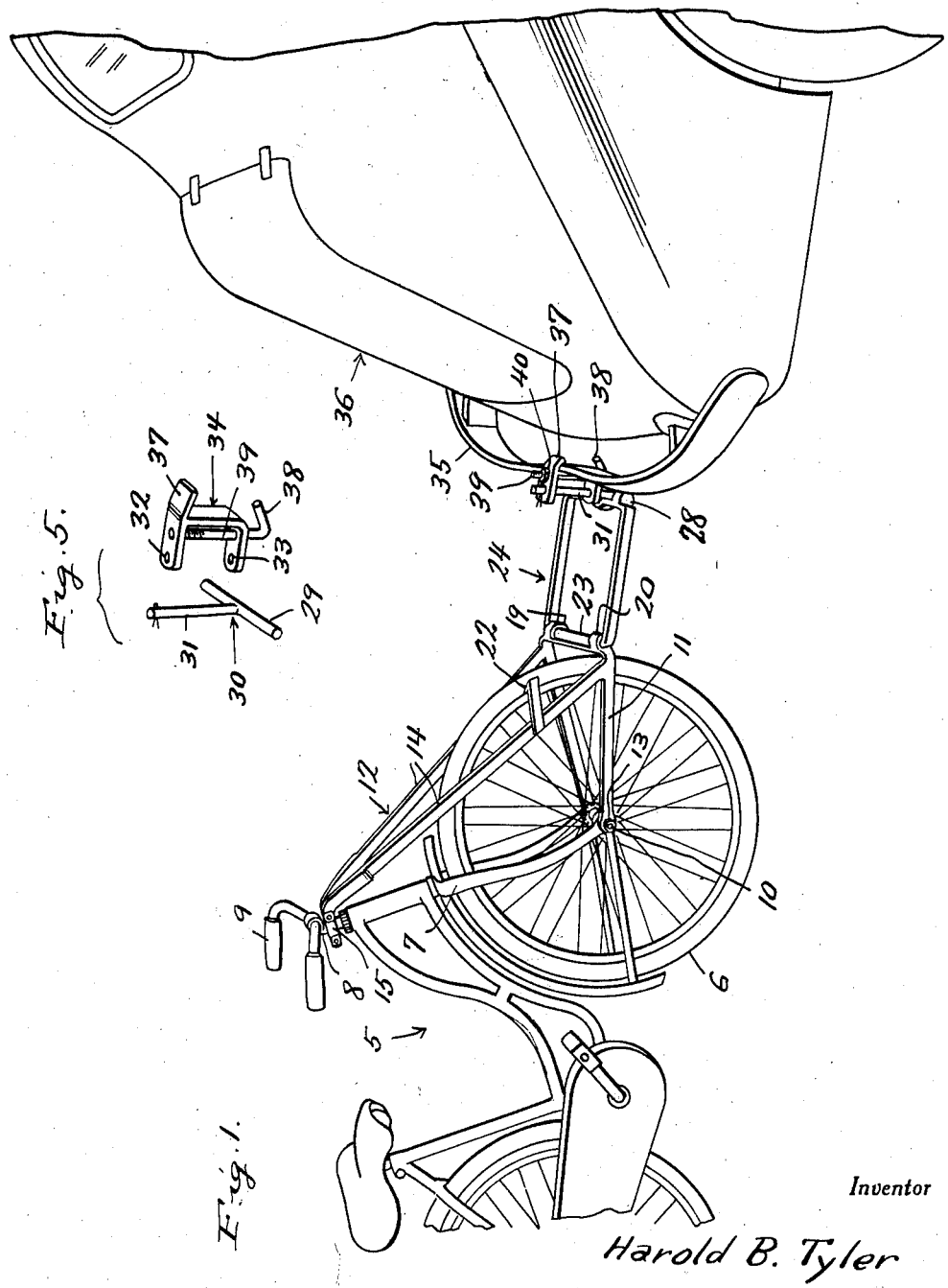
Figure 1 is a general fragmentary perspective view showing a bicycle equipped in accordance with the present invention to be drawn by an automobile.

Referring in detail to the drawings, the numeral 5 generally designates a cycle vehicle in this case a bicycle, having the steerable front wheel 6 mounted between the arms of a fork 7 which terminates at its upper end in a standard 8 to which the handle bars 9 are operatively connected for steering the bicycle. The lower ends of the arms of the fork 7 are traversed by the axle 10 which supports the wheel 6 and which extends beyond the side of the fork. In accordance with the present invention the horizontal arms 11 of the stationary support frame 12 have their rear ends traversed by the laterally extending portions of the axle 10 and secured in position thereon by nuts 13, while the upwardly inclined arms 14 of the frame 12 terminate in concaved portions 15 which engage opposite sides of the standard 8 and have front and rear holes 16, 17, respectively, which are traversed by suitable fastening means to clamp the concave elements 14 together and to opposite sides of the standard 8.

Figure 3:
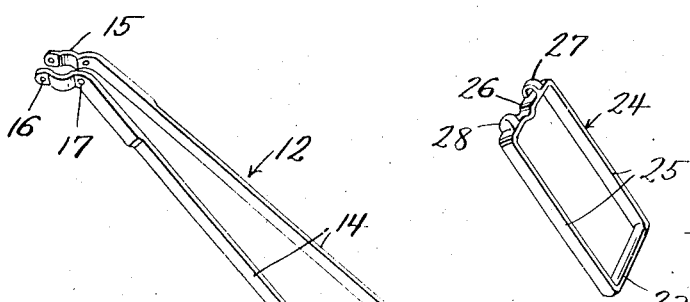
Figure 3 is a side perspective view of the inactive or stationary member of the hitch.
Figure 4:
Figure 4 is a side perspective view of the link.

As shown in Figure 3 of the drawings, the lower ends of the arms 14 of the frame 12 are connected to points adjacent the front ends of the horizontal arms 11, which one end is merged into a transverse horizontal bar 18 which is provided on its forward side with journal bearings 19 and 20. One of the arms 14 has a forwardly extending bracket 21 which has on its laterally inward side a hook or detent 22 for a purpose to be indicated. It should be noted that the spacing of the inclined arms is greater toward their front ends and that the spacing of the horizontal arms 11 is reduced toward their rear ends.

The journal bearings 19 and 20 are sufficiently transversely spaced to provide the desired wide bearing engagement with the rounded bar 23 of the rectangular link 24, to have the desired stabilizing effect on the bicycle 5 and to maintain the same in an erect position when being towed. The front bar 26 of the link 24 is concaved at its middle to provide sufficient clearance relative to the standard 31. The laterally outward sides of the bearings 19 and 20 are arranged to bear against the inner sides of the longitudinal side bars 25 of the link 24 so as to preclude unwanted sidewise lost motion. The front end cross member 26 of the link 24 is provided with spaced journal bearings 27 and 28 which turn on the arms of the head 29 of a T-shaped connector 30 which has its standard 31 in an erect position and rotatably engaged through the aligned holes 32 and 33 in the upper and lower arms, respectively, of the U-shaped clamp 34 which is arranged for connection with the bumper 35 on the rear of the automobile or other tractor vehicle 36. The upper part of the bight portion of the clamp 34 has a forwardly declining projection 37 which is designed to engage over the upper edge of the bumper 35 as illustrated in Figure 1 in opposition to a hook 38 on the lower end of an adjustable bolt 39 which traverses the legs of the clamp as shown in Figure 5, the hook 38 engaging the lower edge of the bumper 35 as shown. A nut 40 is screwed on the upper end of the bolt 39 and then the top of the clamp to draw the hook 38 up against the lower edge of the bumper bar in opposition to the projection 37 as will be obvious. It is to be noted in connection with the journal bearings 27 and 28 on the link 24 that they are closed at their outer ends instead of open as in the case of the bearings 19 and 20. The closed outer ends of the bearings 27 and 28 act as stops for the opposite ends of the head 39 on the connector 30 so as to prevent unwanted sidewise motion thereof relative to the link 34.

Figure 2:
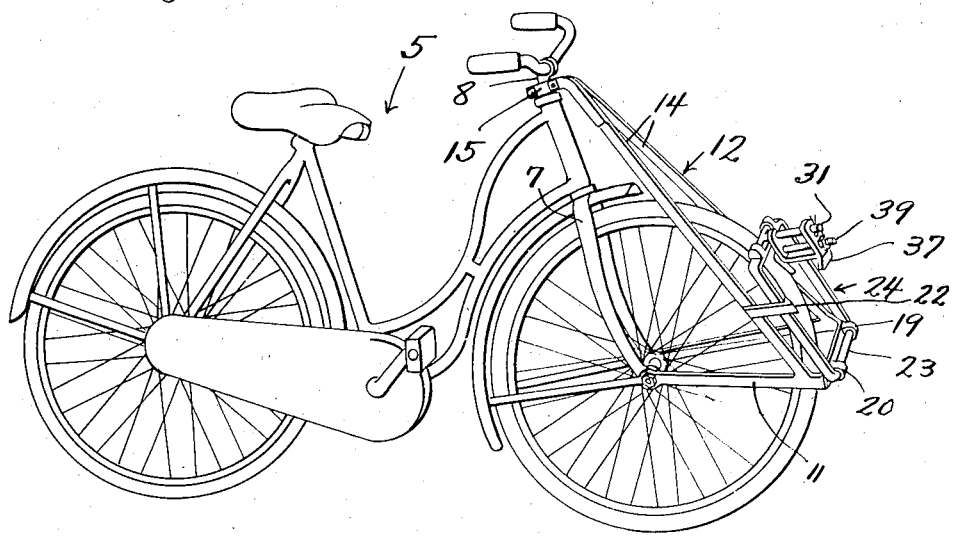
Figure 2 is a side perspective view of a bicycle equipped in accordance with the present invention and with the active member of the hitch withdrawn into inoperative position.

It is believed obvious that with the cooperative parts engaged as described and shown that the bicycle 5 or the like will trail behind the automobile 36 in an erect position and that all changes and position between the tractor vehicle and the bicycle are compensated for by the connection described. When the bicycle or the like is unconnected with the vehicle and the clamp is removed from the bumper 35 the link 34 may be swung rearwardly to the position shown in Figure 2 of the drawings so that one of the sides 25 of the link will thrust past the detent 22 to a position in which the detent holds the same as shown in Figure 2. Engagement of the side members of the link 24 with the upper edge of the front bar 18 of the stationary frame, or some other suitable arrangement may be provided, for preventing the link 24 from swinging too far rearwardly and becoming engaged with the wheel 6 of the bicycle or the like.

Although I have shown and described herein a preferred embodiment of my invention, it is to be definitely understood that I do not desire to limit the application of the invention thereto except as may be required by the scope of the subjoined claims.

Having described the invention, what is claimed as new is:

1. A connecting clamp for coupling a towed vehicle to the rear bumper guard of a towing vehicle, said clamp comprising a reclining U-shaped element providing upper and lower rearwardly projecting arms, a first jaw projecting forwardly from said U-shaped element for engagement with the upper edge of the bumper bar, a companion jaw consisting of a vertical rod movably traversing said arms and having a forwardly projecting radial member arranged to engage the lower edge of said bumper bar, tightening means operating between said U-shaped element and said vertical rod for contracting and holding the jaws in engagement with the edges of said bumper bar, a vertical king pin connected to the free end portions of said arms for rotation only on a vertical axis, a pair of laterally and oppositely projecting axially aligned pintles on one of said vertical king pin.

2. A connecting clamp according to claim 1 wherein said first jaw is rigidly secured on the upper front part of said U-shaped element.

3. A connecting clamp according to claim 1 wherein said forwardly projecting radial member is located on the lower end of said king pin on a level below the lower arm of said U-shaped element.

4. A connecting clamp according to claim 1 wherein said forwardly projecting radial member is located on the lower end of said king pin on a level below the lower arm of said U-shaped element, said tightening means comprising a nut bearing upon the upper arm of said U-shaped element and threaded on the upper end of said king pin.

5. A trailer hitch for a bicycle, said bicycle having a steerable front fork with a front wheel mounted between the lower ends of the legs of said fork, substantially horizontal arms projecting forwardly from and having their rear ends connected to the lower ends of said legs with their forward ends projecting to points in front of said wheel, a relatively long transverse cross member rigidly connected to and between the front ends of said horizontal arms, rearwardly inclining braces connected at their depressed forward ends to forward portions of said horizontal arms with their upper ends connected to upper portions of said fork, widely transversely spaced hinge pin barrels on said cross member adjacent the opposite ends of said cross member, a draw bar comprising a U-shape with its bight portion journalled in said hinge pin barrels with its legs arranged outside of and adjacent to the corresponding barrels to act as stop and abutments to stabilize the bicycle.

6. In a trailer hitch for a bicycle, said bicycle having a steerable fork including a front wheel and a relatively wide rigid horizontal bar extending transversely across in front of said wheel, a draw bar consisting of a longitudinally elongated rectangular open frame consisting of front and rear cross members and substantially parallelly spaced longitudinal side members spacing and connecting said cross members, hinge barrels projecting from said horizontal bar adjacent the opposite ends thereof with said rear cross member of said frame journalled therein and with said longitudinal side members arranged close to the outer sides of the corresponding hinge barrels so as to preclude substantial lateral movement of said frame relative to said fork, and connecting means on said front cross member of said frame for connecting the same to the rear bumper bar of a tractor vehicle.

7. In a trailer hitch for a bicycle, said bicycle having a steerable fork including a front wheel and a relatively wide rigid horizontal bar extending transversely across in front of said wheel, a draw bar consisting of a longitudinally elongated rectangular open frame consisting of front and rear cross members and substantially parallelly spaced longitudinal side members spacing and connecting said cross members, hinge barrels projecting from said horizontal bar adjacent the opposite ends thereof with said rear cross member of said frame journalled therein and with said longitudinal side members arranged close to the outer sides of the corresponding hinge barrels so as to preclude substantial lateral movement of said frame relative to said fork, and connecting means on said front cross member of said frame for connecting the same to the rear bumper bar of a tractor vehicle, said connecting means comprising a pair of clamping jaws for gripping the upper and lower edges of said bumper bar, a vertical axis king pin rotatably transversing vertically spaced points of one of said jaws, oppositely laterally extending pintles on said king pin, and relatively widely spaced journal bearings on said front cross member of said frame connectively receiving said pintles.

HAROLD B. TYLER.